US011985385B1

(12) United States Patent
Ramesh et al.

(10) Patent No.: US 11,985,385 B1
(45) Date of Patent: May 14, 2024

(54) DYNAMIC CONTROL OF MEDIA-CONTENT PRESENTATION BASED ON USER PRESENCE AND/OR USER PROFILE

(71) Applicant: Roku, Inc., San Jose, CA (US)

(72) Inventors: Sunil Ramesh, Cupertino, CA (US); Michael Cutter, Golden, CO (US); Ronica Jethwa, Mountain View, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/107,675

(22) Filed: Feb. 9, 2023

(51) Int. Cl.
*H04N 21/442* (2011.01)
*H04N 21/4415* (2011.01)
*H04N 21/482* (2011.01)

(52) U.S. Cl.
CPC ... *H04N 21/44218* (2013.01); *H04N 21/4415* (2013.01); *H04N 21/4821* (2013.01)

(58) Field of Classification Search
CPC .......... H04N 21/4415; H04N 21/4821; H04N 21/44218
See application file for complete search history.

(56) References Cited

U.S. PATENT DOCUMENTS

| 7,131,132 | B1* | 10/2006 | Gehlot | H04H 60/33 713/168 |
| 8,935,727 | B2* | 1/2015 | Beppu | H04N 21/4668 725/12 |
| 9,215,490 | B2* | 12/2015 | Won | H04N 21/4325 |
| 9,712,870 | B2* | 7/2017 | Gonzalez | H04N 21/4223 |
| 10,667,005 | B2* | 5/2020 | Duan | H04N 21/4126 |
| 11,711,586 | B2* | 7/2023 | Wittke | H04N 21/47217 725/59 |
| 2009/0252476 | A1* | 10/2009 | Kimura | H04N 5/775 340/5.83 |
| 2009/0285545 | A1* | 11/2009 | Bon | H04N 21/4415 386/239 |
| 2009/0307196 | A1* | 12/2009 | Shuster | H04L 43/10 709/224 |
| 2011/0173662 | A1* | 7/2011 | Beppu | H04N 21/4668 725/46 |

(Continued)

FOREIGN PATENT DOCUMENTS

| EP | 2688310 A2 * | 1/2014 | ......... H04N 21/4223 |
| WO | WO-0242959 A2 * | 5/2002 | ............. G06Q 30/02 |

*Primary Examiner* — James R Sheleheda
(74) *Attorney, Agent, or Firm* — Mcdonnell Boehnen Hulbert & Berghoff LLP

(57) ABSTRACT

A method and system for controlling media-content presentation based on user presence and/or user profile. An example method includes a computing system determining a quantity of users present at a media-presentation device, the quantity being at least one. Further, the example method includes, based on the determining, the computing system using the determined quantity of users present at the media-presentation device as a basis to control what media content a media player outputs for presentation by the media-presentation device. For instance, based on the determined quantity of users the computing system could tailor a graphical user interface (GUI) that the media player outputs for presentation by the media-presentation device, such as by tailoring a set of channel options that a channel-selection GUI provides, among other possibilities.

20 Claims, 14 Drawing Sheets

(A)

(B)

(56) References Cited

U.S. PATENT DOCUMENTS

| | | | |
|---|---|---|---|
| 2012/0060176 A1* | 3/2012 | Chai | H04N 21/25891 |
| | | | 725/10 |
| 2012/0066705 A1* | 3/2012 | Harada | H04N 21/42201 |
| | | | 725/12 |
| 2012/0124456 A1* | 5/2012 | Perez | H04N 21/44218 |
| | | | 715/200 |
| 2013/0047175 A1* | 2/2013 | Ramirez Flores | H04N 21/4223 |
| | | | 725/12 |
| 2014/0223461 A1* | 8/2014 | Hatambeiki | H04N 21/4415 |
| | | | 725/10 |
| 2015/0334457 A1* | 11/2015 | Chandel | H04N 21/44218 |
| | | | 725/12 |
| 2018/0285654 A1* | 10/2018 | Muhammad | G06V 20/52 |
| 2021/0014569 A1* | 1/2021 | Rishea | H04N 21/42204 |
| 2021/0224015 A1* | 7/2021 | Choi | H04N 21/41407 |
| 2021/0344999 A1* | 11/2021 | Gupta | H04N 21/4532 |
| 2023/0239537 A1* | 7/2023 | Chandel | H04N 21/4661 |
| | | | 725/12 |

* cited by examiner

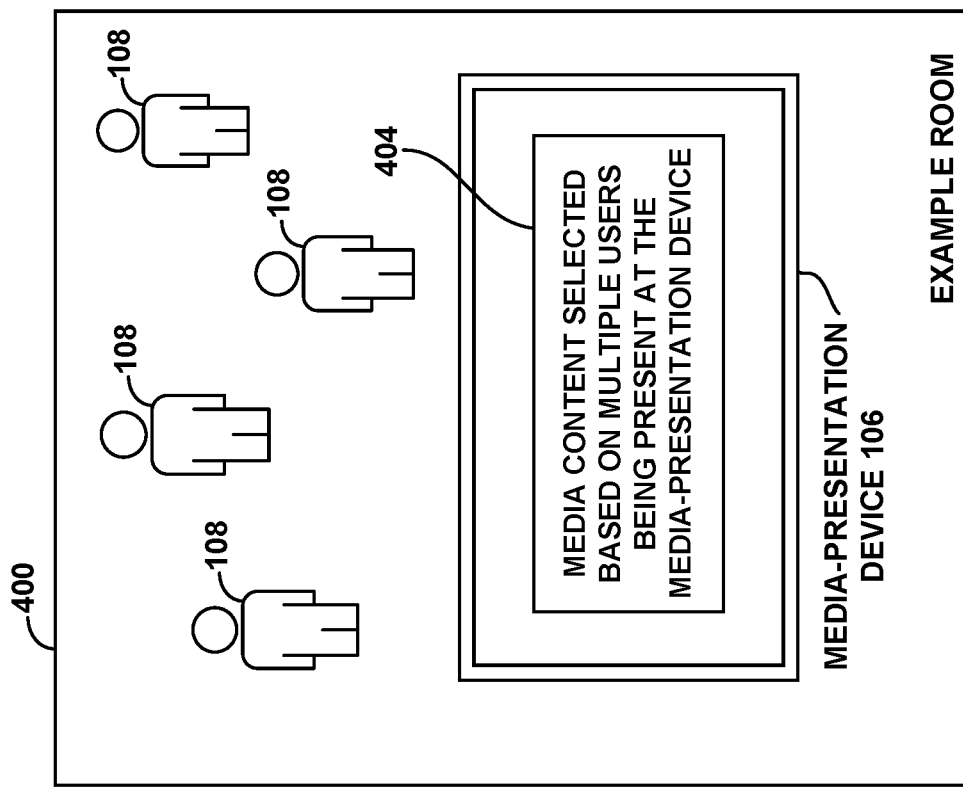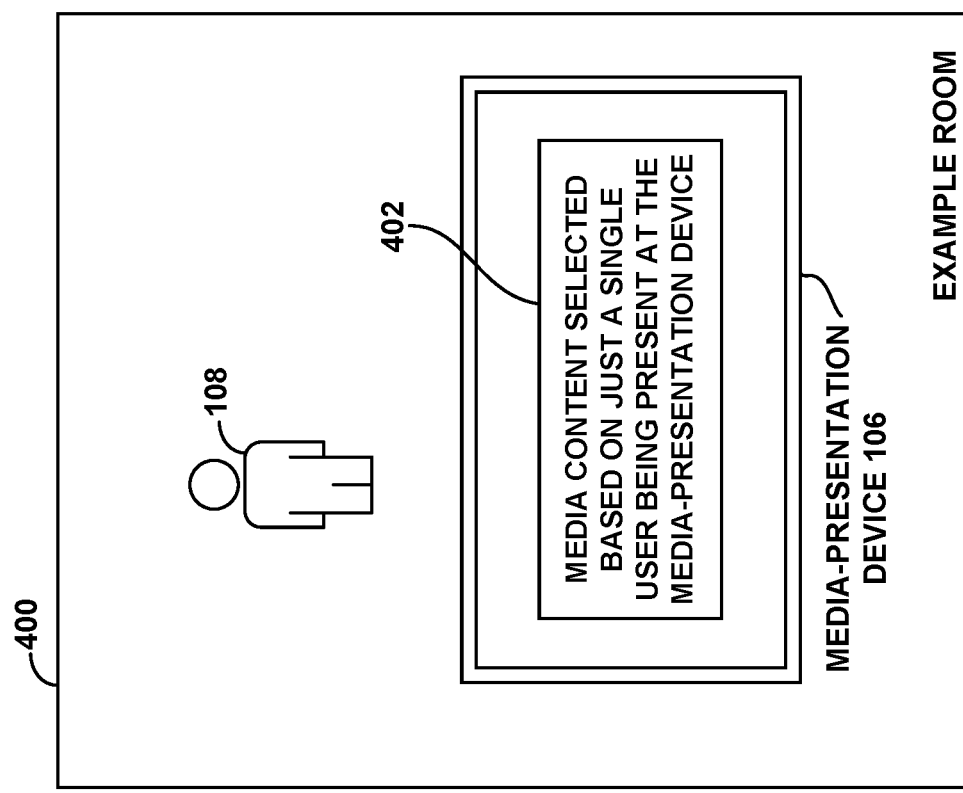
Fig. 4

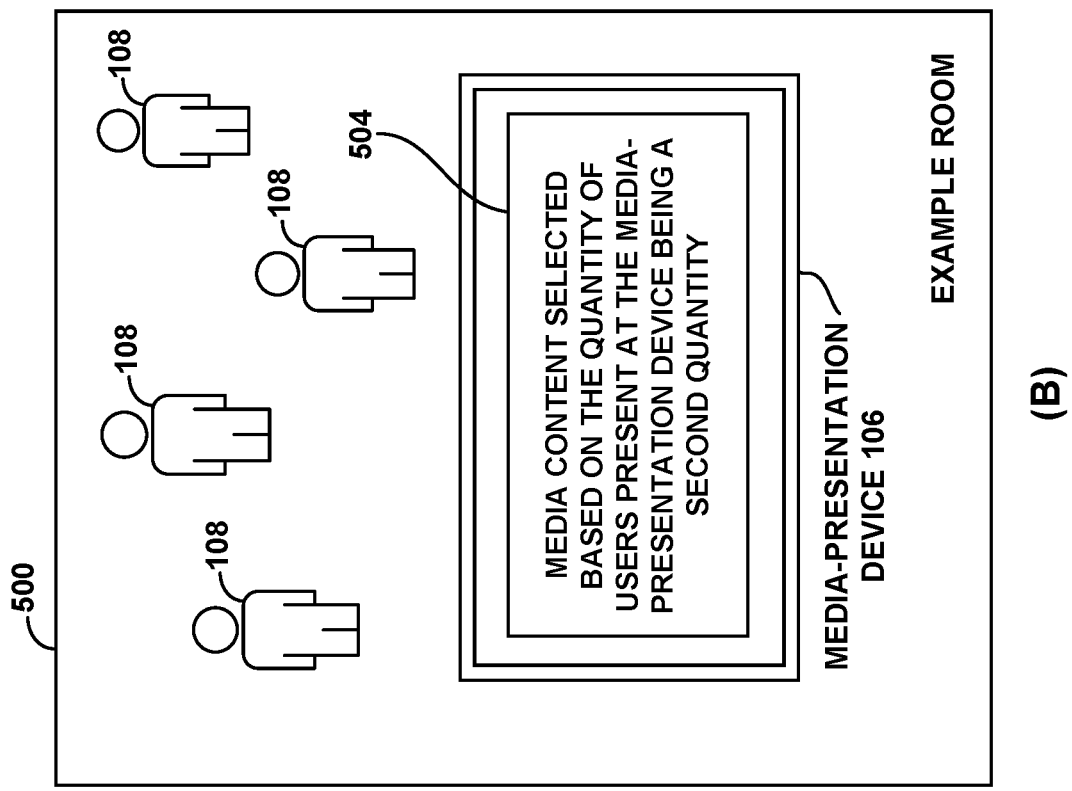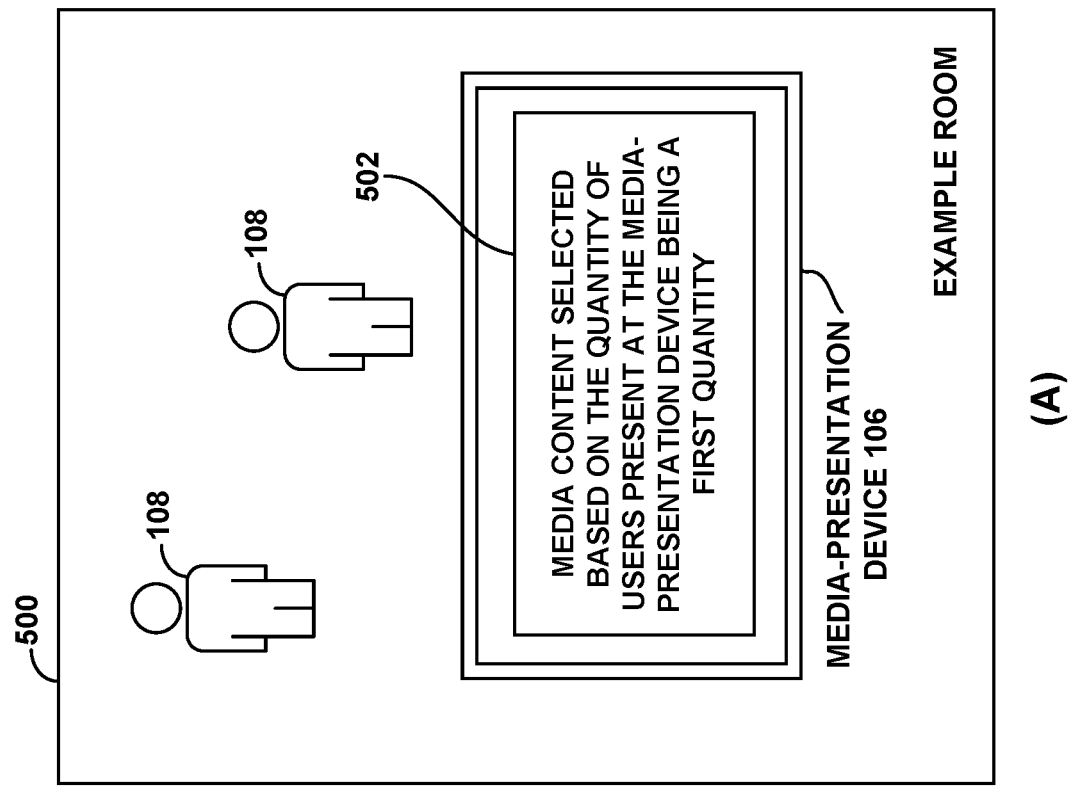
Fig. 5

US 11,985,385 B1

DYNAMIC CONTROL OF MEDIA-CONTENT PRESENTATION BASED ON USER PRESENCE AND/OR USER PROFILE

SUMMARY

A media-presentation system operates to facilitate presentation of media content, such as video, audio, or multimedia content, to end users. An example of such a system could include client-side equipment positioned at customer premises and arranged to output and present media content on a user interface such as a display screen with an associated sound system, and server-side equipment arranged to serve media content to the client-side equipment for presentation.

By way of example, the client-side equipment could include a media-presentation device such as a television (TV), monitor, tablet computer, or mobile phone, which could present the media content on a user interface. Further, the client-side equipment could include a media player such as an over-the-top (OTT) streaming media player, cable or satellite set top box, digital video recorder, disc player, gaming system, mobile phone, personal computer, audio/video receiver, or tuner, which could be integrated with or in local or network communication with the media-presentation device and could output media content to the media-presentation device for presentation on the user interface. And the server-side equipment could include a media server and/or head-end equipment, operated by an OTT provider (e.g., virtual multichannel video programming distributor (virtual MVPD)), cable or satellite TV provider, or the like, which could stream or otherwise deliver media content to the client-side equipment for presentation.

The media content that an example media-presentation system presents may include both menu media content and real-time media content. Without limitation, for example, the media content may include a graphical user interface (GUI) defining a menu structure through which a user may navigate through use of a remote control or other input device in order to select and request playout of desired real-time media content (e.g., television programs or movies) and/or to make configuration changes to the system. Further, the media content may include the real-time media content selected by a user through such a GUI and/or otherwise provided by the system.

In some scenarios, it may be useful for a computing system to take into account how many users are present at a media-presentation device as a basis to dynamically control what media content the media-presentation device will present. For instance, it may be useful for the computing system to cause the media-presentation device to present a particular type, format, or other selection of media content when just a single user is present at the media-presentation device but to present a different type, format, or other selection of media content when more than one user is present at the media-presentation device. More generally, it may be useful for the computing system to cause the media-presentation device present a particular type, format, or other selection of media content when a first quantity of users is present at the media-presentation device but to present a different type, format, or other selection of media content when a second quantity of users is present at the media-presentation device, with the first quantity and second quantity each being at least one and being different than each other.

Dynamically controlling what media content a media-presentation device will present based on how many users are present at the media-presentation device may facilitate presenting media content that is tailored to that quantity of users. For instance, statistics about content presented at various media-presentation devices over time may demonstrate a tendency (e.g., preference) for users to select particular channels and/or particular programs or movies when alone but to select other channels and/or other programs or movies when with others. Based on these statistics and/or based on one or more other considerations, it may be useful for a computing system to dynamically tailor what channels are shown as options in a media-content-selection GUI that a media-presentation device will present, with the dynamic tailoring being based on how many users are present at the media-presentation device. Likewise, based on these statistics and/or based on one or more other considerations, it may be useful for a computing system to dynamically control what real-time media content a media-presentation device will present, with the dynamic controlling being based on how many users are present at the media-presentation device.

Further, it may be useful to have the computing system carry out this dynamic control based on the computing system's own determination of how many users are present at the media-presentation device, i.e., without a user entering into or otherwise expressly informing the computing system how many users are present. For instance, it may be useful to have the computing system use any of various presence-detection techniques to detect user presence at the media-presentation device and to thereby determine a quantity of users present at the media-presentation device. And it may be useful to have the computing system use that determined quantity of present users as a basis to dynamically control what media content the media presentation device will present.

Accordingly, disclosed herein is a method and system for dynamically controlling media-content presentation based on user presence. In accordance with the disclosure, a computing system will determine a quantity of users present at a media-presentation device, and the computing system will use the determined quantity as a basis to control what media content the media-presentation device will present. For instance, based on the determined quantity of users, the computing system may select, tailor, and/or otherwise establish what media content the media-presentation device should present and may cause the media-presentation device to present the established media content.

More particularly, the computing system may use the determined quantity of users present at the media-presentation device as a basis control whether to cause the media-presentation device to present first media content or rather to present second media content.

For instance, the computing system may exert this control based on whether the determined quantity of users present at the media-presentation device is just one or is rather more than one, such as by (i) causing the media-presentation device to present first media content rather than second media content if the determined quantity of users present at the media-presentation device is just one rather than more than one and (ii) causing the media-presentation device to present second media content rather than first media content if the determined quantity of users present at the media-presentation device is more than one rather than just one.

Or the computing system may exert this control based on what non-zero quantity of users the determined quantity is, such as by (i) causing the media-presentation device to present first media content rather than the second media content if the determined quantity of users present at the media-presentation device is a first non-zero quantity rather than a second non-zero quantity and (ii) causing the media-presentation device to present the second media content rather than the first media content if the determined quantity of users present at the media-presentation device is the second non-zero quantity rather than the first non-zero quantity.

These and other as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 4 is a simplified illustration of how the media content presented by a media-presentation device 106 could vary based on quantity of users determined to be present at the media-presentation device.

FIG. 5 is another simplified illustration of how the media content presented by a media-presentation device 106 could vary based on quantity of users determined to be present at the media-presentation device.

DETAILED DESCRIPTION

The present description will discuss an example implementation where the media player is an OTT media player, either connected or integrated with a television or other media-presentation device and configured to play OTT content streamed on demand from an OTT server, for presentation by the media-presentation device. It should be understood, however, that principles discussed herein could extend to apply as well with respect to other types of media players and media-presentation devices, such as but not limited to those noted above. For instance, the principles could extend to apply with respect to presentation of audio only, such as to playout of music (e.g., controlling what music a media player plays, based on how many users are present where the music would be presented).

More generally, it should be understood that the arrangements and processes described herein could take various other forms. For instance, elements and operations could be re-ordered, distributed, replicated, combined, omitted, added, replaced, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units or other processors executing program instructions stored in memory or other data storage, among other possibilities.

Figure 1:
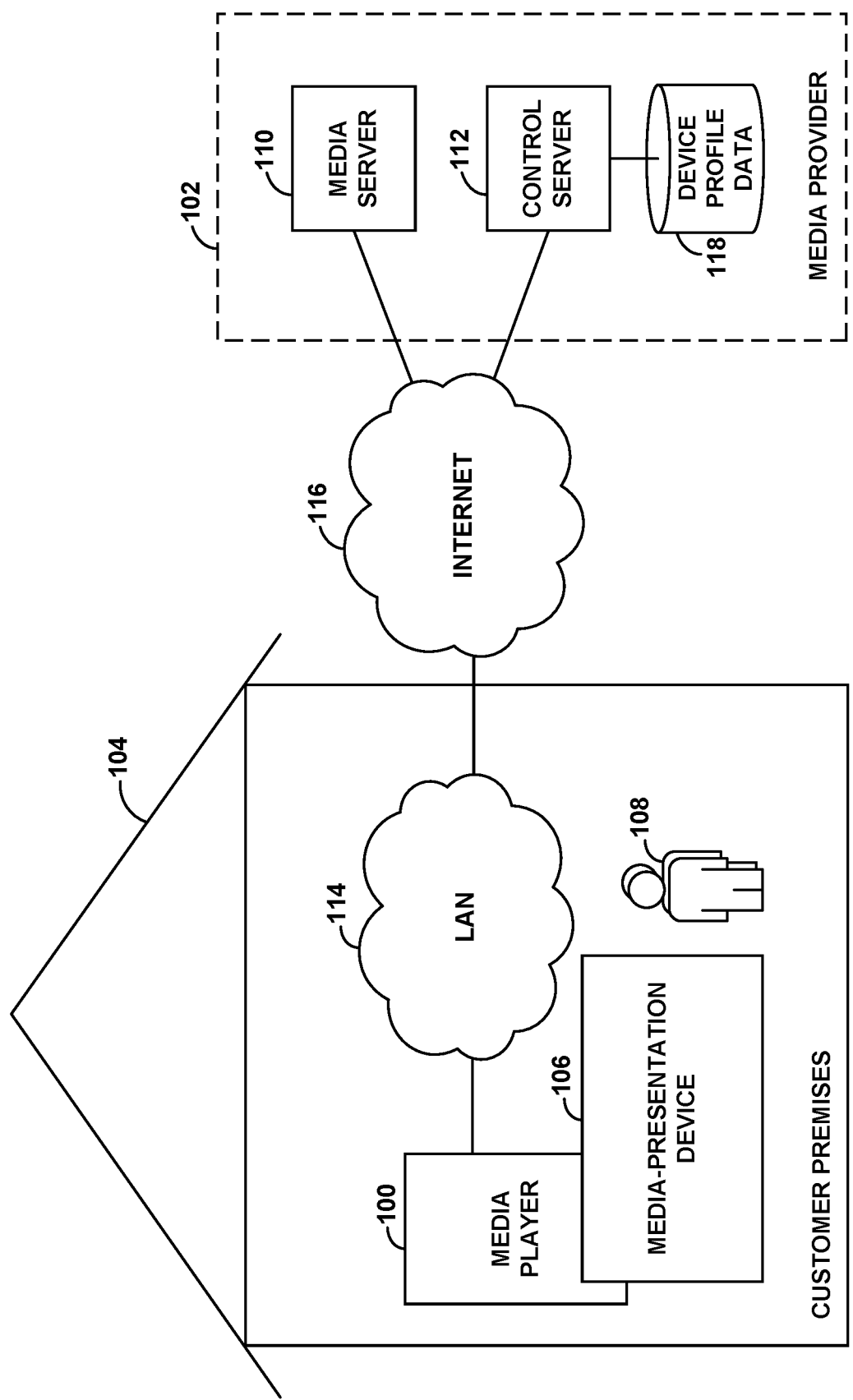
FIG. 1 is a simplified block diagram of an example media-presentation system.

Referring to the drawings, FIG. 1 is a simplified block diagram of an example media-presentation system. The example media-presentation system includes a media player 100, which is configured to receive and play streaming media content, and a network-based media provider 102, which is configured to stream and/or otherwise provide media content to the media player 100 for playout.

The media player 100 may be located at a customer premises 104, such as a house, apartment, or business establishment. Further, the media player 100 may be connected or integrated with a television or other media-presentation device 106 that is configured to receive media content being played by the media player 100 and to present the media content to one or more users 108. For instance, the media player 100 could be connected with the media-presentation device 106 by a High Definition Multimedia Interface (HDMI) connection and/or by one or more other wired or wireless connections. Alternatively, the media player 100 could be integrated as a component of the media-presentation device 106.

As further shown, the example media provider 102 includes a media server 110 and a control server 112 (e.g., a server platform including one or more such servers). The media server 110 may support streaming or otherwise providing of media content on demand to the media player 100, for playout by the media player 100. And the control server 112 may facilitate streaming of the media content from the media server 110 to the media player 100 and may also engage in other control interaction with the media player 100, such as to provide the media player 100 with GUIs for the media player 100 to render for presentation, and to receive and respond to user input received by the media player 100 through such GUIs, requesting particular on-demand content for instance.

In an example implementation, the media player 100 could be in network communication with both the media server 110 and the control server 112. For instance, the media player 100 (e.g., itself or a host media-presentation device) may sit as a node on a local area network (LAN) 114 at the customer premises 104, having an assigned local Internet Protocol (IP) address for communication on that LAN 114, and the LAN 114 may be interconnected with the public internet 116, having an assigned public IP address for communication on the internet. Further, the media server 110 and control server 112 may also have assigned public IP addresses on the internet. The media player 100 may therefore engage in IP-based communication with the media server 110 and the control server 112 through the LAN 114 and through the internet 116.

In addition, the media provider 102 may include or otherwise have access to data that helps enable the media provider 102 to serve the media player 100. For instance, as shown, the media provider 102 may have access to device profile data 118. This device profile data 118 may include information about configuration and capabilities of each of various media players served by the media provider 102, including media player 100, such as but not limited to a list of streaming-media channels (e.g., OTT channels) that are to be made available to the media player, a history of media played by the media player, information about presence-detection capabilities, and information about various other settings and configuration parameters of the media player, among other possibilities.

When the media player 100 and media-presentation device 106 are powered on (e.g., when separate such devices are connected with each other and powered on or when a media-presentation device with integrated media player is powered on), the media-presentation device 106 may present media content that the media player 100 outputs. This media content may include a GUI defining a menu structure through which a user of the media player 100 may navigate, through use of a remote control or other input device, in order to select and request playout of desired on-demand media content (e.g., programs or movies) and/or to make configuration changes to the media player 100. Further, the media content may include selected on-demand media content, such as streaming-media content selected by a user and served by the media server 110, for instance, among other examples of media content.

Figure 2:
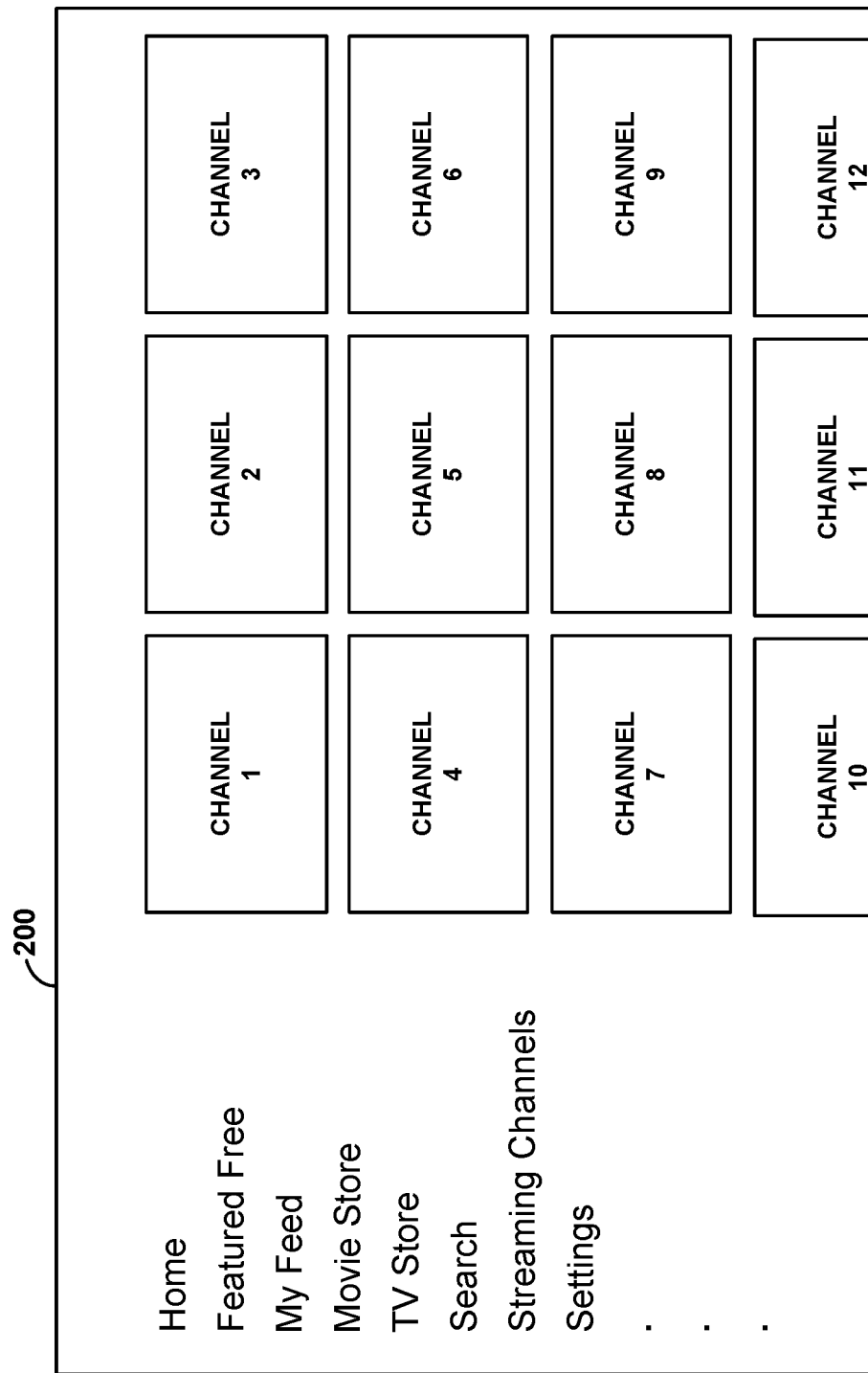
FIG. 2 is a simplified illustration of an example GUI that could be presented.

FIG. 2 illustrates an example GUI 200 that the media player 100 may output for presentation by the media-presentation device 106 as a default or "home" menu interface (e.g., upon startup and/or upon returning to a default mode after playing on-demand content or upon user direction). As shown in FIG. 2, the example GUI 200 includes at its right side various graphical objects representing respective streaming-media channels (i.e., channel options) available for user selection. By navigating through this GUI and perhaps through one or more sub-GUIs, a user may thereby select and request playout of desired on-demand content, which may trigger signaling between the media player 100 and the media provider 102 to initiate streaming of the requested content to the media player 100 for playout and presentation by the media-presentation device 106. Further, the example GUI 200 includes at its left side a list other user-selectable options, including a streaming-channels option through which the user may configure what channels would be presented at the right side of the GUI 200, among other possibilities.

The media player 100 may interwork with the control server 112 to obtain this and/or other GUIs for the media player 100 to output for presentation by the media-presentation device 106. For instance, the media player 100 may engage in control signaling with the control server 112 to request a GUI, the control server 112 may responsively deliver the GUI to the media player 100 in the form of one or more markup documents (e.g., Hypertext Markup Language (HTML) documents) defining the GUI, and the media player 100 may then render the GUI as media for presentation by the media-presentation device 106. Further, the media player 100 may engage in this interaction with the control server 112 in the background and may store the GUI markup documents for later use when appropriate.

The control server 112 may structure such a GUI (e.g., one or more markup documents defining the GUI) in accordance with the device profile data 118. The media player 100 might initially have a factory-default configuration, and the device profile data 118 may store that default configuration, so that a GUI provided by the control server 112 would have a default structure, including a default set of channels for instance. When a user interacts with the media player 100 to change the media player's configuration, such as adding or removing channels for example, the media player 100 may signal those changes to the control server 112, and the control server 112 may update the device profile data 118 accordingly, so that a GUI then provided by the control server would reflect the changed configuration.

When a user navigates through a GUI such as that shown in FIG. 2 and selects a streaming media channel or other media content to be played by the media player 100, the media player 100 may then engage in the signaling with the control server 112 and/or the media server 110 to initiate streaming of that media content to the media player 100 for playout and presentation by the media-presentation device 106. Streaming of media content on demand from the media server 110 to the media player 100 could operate according to any of a variety of well-known adaptive bit-rate streaming protocols, such as Dynamic Adaptive Streaming over Hypertext Transfer Protocol (HTTP) (DASH), HTTP Live Streaming (HLS), or Smooth Streaming Transport Protocol (SSTP), among other possibilities. The details of these streaming protocols and their associated control signaling are known and therefore not described here.

As the media player 100 plays on-demand media content, the media player 100 and/or media provider 102 may keep a record of the media content played. For instance, as the media player 100 plays on-demand media content streamed by the media provider 102, the control server 112 may update the device profile data 118 to establish a record of the content being played. Alternatively, if the played media content is of a particular content type (e.g., a particular genre of content), the control server 112 may update the device profile data 118 to establish a record that the media player 100 played content of that type. Further, the control server 112 may record other data regarding this playout of content, such as an indication of the date and time of playout, among other possibilities.

As noted above, the present disclosure provides for a computing system controlling media-content presentation based on how many users are present at a media-presentation device 106. In the arrangement illustrated in FIG. 1, for instance, this can involve the computing system controlling what media content gets output by the media player 100 and thus presented by media-presentation device 106, with the controlling being based at least on how many users 108 are present at the media-presentation device 106. The computing system that carries out this process could include the media player 100 and/or one or more network servers, such the control server 112 for instance, and could further include the media presentation device 106, one or more connected or integrated presence sensors, and/or one or more other components.

Figure 3:
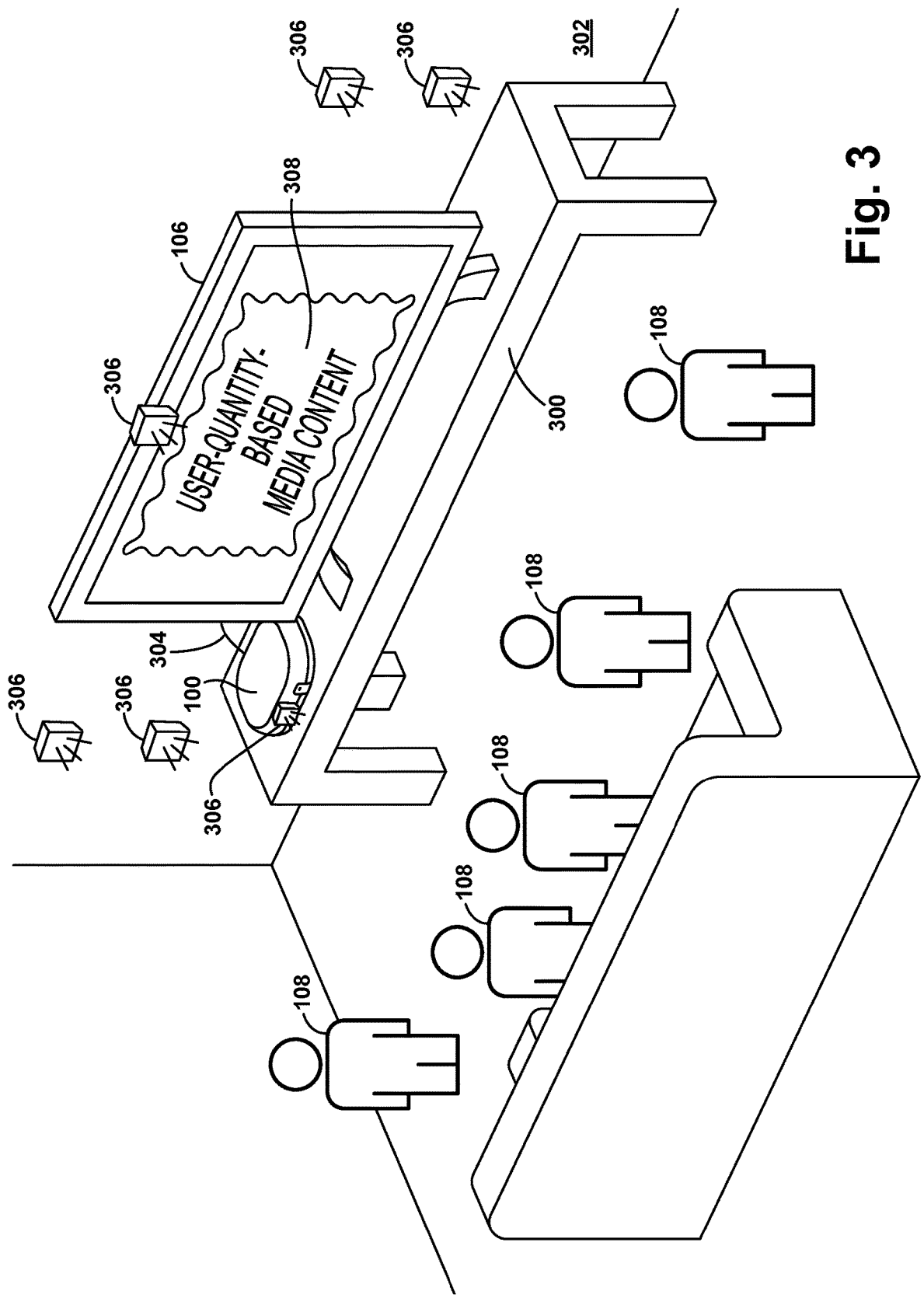
FIG. 3 is simplified illustration of an example scenario where a quantity of users determined to be present at a media-presentation device could be used as a basis to control what media content a media player outputs for presentation by the media-presentation device.

FIG. 3 illustrates an example of how this process could play out in practice.

In particular, FIG. 3 illustrates a room arrangement in which the media-presentation device 106 is positioned on a table 300 against a wall 302, such that users 108 in the room could watch media content being presented by the media-presentation device 106. Further, the figure depicts media player 100 sitting next to the media-presentation device 106 on the table 300 and connected with the media-presentation device 106 by a cable 304 such as an HDMI cable for instance. In addition, the figure depicts various sensors 306 that could facilitate detecting user presence, to facilitate having the computing system control media-content presentation based on how many users 108 are present at the media-presentation device 106. As shown in this example, the sensors 306 may be situated at various positions to facilitate such presence detection. For instance, the sensors 306 could be provided on the wall 302 to the sides of the media-presentation device 106, and/or in, on, or otherwise at the media-presentation device 106 and/or media player 100, among other possibilities. A user could manually place and configure these sensors to be used for this purpose, among other possibilities.

The figure then depicts the media-presentation device 106 presenting user-quantity-based media content 308, i.e., media content selected, tailored, and/or otherwise established based on how many users are present at the media-presentation device 106. For instance, the presented media content could be media content that the computing system selects, tailors, and/or otherwise establishes based on a determination by the computing system that the quantity of users 108 at the media-presentation device 106 is more than one, and/or based on a determination by the computing system that the quantity of users at the media-presentation device is five as shown, among other possibilities.

In an example implementation, the computing system could engage in a process to determine how many users 108 are present at the media-presentation device 106, so that the computing system could then cause the media player 100 to output media content selected, tailored, or otherwise established based on that determined quantity of users 108. The act of determining how many users 108 are present at the media-presentation device 106 could involve determining how many users 108 are positioned in front of the media-presentation device 106 and/or nearby the media-presentation device 106 such that they could consume media content presented by the media-presentation device 106, even if they may need to move or turn to do so. For instance, in a scenario where the media-presentation device 106 is in a room of customer premises, this may involve determining how many users 108 are in that room, among other possibilities.

The computing system could engage in this user-counting process periodically and/or in response to one or more trigger events, such as in response to detecting receipt of user input at media player and/or media-presentation device (e.g., detecting remote-control input) and/or in response to detecting motion at the media-presentation device 106 (e.g. by application of one or more motion sensors), among other possibilities. Further, the computing system may make a reasonable effort to determine how many users are present at the media-presentation device 106 and may use the determined quantity as a basis to control media content presentation, even if the determined quantity is not exactly correct.

The process of determining how many users 108 are present at the media-presentation device 106 could involve detecting the presence of each of one or more individual users 108 at the media-presentation device 106 and counting how many users 108 are so detected as being currently present at the media-presentation device 106. The computing system could use any of a variety of presence-detection techniques for this purpose. For instance, presence-detection techniques could include computer-vision, proxy detection of wireless signaling, and voice recognition, among other possibilities.

Presence detection through computer-vision could involve use of one or more cameras to capture image data representing the space in front of or otherwise at the media-presentation device 106, and evaluating the image data to detect user presence in that space. For instance, the sensors 306 shown in FIG. 3 could include one or more optical cameras positioned in or near the media-presentation device 106. These cameras could be configured to capture one or more images of the space and to provide the resulting image data to an image processing unit of the computing system for analysis. The computing system could then evaluate the captured image data, performing pattern recognition such as human skeletal shape recognition for instance, or other analysis to identify each of one or more human beings depicted by the image data and thus likely present in the space. Further, the computing system could count the number of such detected human beings as a count of users 108 present at the media-presentation device 106.

Alternatively or additionally, the sensors 306 shown in FIG. 3 could include other types of imaging sensors, such as lidar, radar, or sonar sensors, which the computing system could likewise use as a basis to image the space at the media-presentation device 106. And based on this sensor data, the computing system could likewise identify one or more human beings in the space and establish a count of the detected human beings as a count of users 108 present at the media-presentation device 106.

Presence detection through proxy detection of wireless signaling could involve engaging in wireless signaling to detect presence nearby the media presentation device 106 of one or more wireless communication devices that may be carried by users, thus indicating the presence of those users nearby the media-presentation device 106. For instance, the sensors 306 shown in FIG. 3 could include one or more signaling devices positioned in or near the media-presentation device 106, which could be configured to engage in signaling according to one or more wireless communication protocols, such as UWB, BLUETOOTH, ZIGBEE, WIFI, LTE, 5G, or 6G, with cell phones, smart watches, and/or other user devices that are likely to be with their respective users. Based on signaling detected by one or more such signaling devices, the computing system could thus determine how many user devices are present in the space and could use that count as an approximation of the number of users 108 in the space and thus at the media-presentation device.

One or more such signaling devices may be configured to operate with a wireless signaling range (e.g., transmission power and/or receiver sensitivity) corresponding with a size of the room or other area where the media-presentation device 106 is positioned, to help facilitate detecting presence of user devices in that area in particular (e.g., to help minimize the detecting of user presence outside of that area). Further, an example such signaling device may be configured to broadcast signaling to which various user devices would respond, indicating the presence of the user devices, and/or may be configured to passively monitor for wireless signaling emitted by the user devices, likewise indicating their presence. As a specific example of this, a signaling device positioned in or near the media-presentation device 106 could be configured with circuitry and logic necessary to operate as a faux WiFi access point or cellular base station (with a suitable local range), broadcasting advertisement or reference signals to which nearby user devices may respond with access requests, thereby indicating their presence.

Presence detection through voice recognition could involve use of one or more microphones to receive audio in the environment around the media-presentation device 106, and evaluating the received audio to detect user presence. For instance, the sensors 306 shown in FIG. 3 include one or more microphones positioned in or near the media-presentation device 106, which could be configured to receive audio, and the computing system could evaluate the audio to detect discrete voices in the audio, each discrete voice representing a different respective person in the environment. By counting the number of such discrete voices detected in the environment, the computing system could thereby establish a count of the number of users 108 in the environment, as a count of users 108 at the media-presentation device 106.

Numerous other user presence detection techniques could be used as well. Further, combinations of various user presence detection techniques could be used, either to form an aggregate count of users or as a check for each other. For instance, the computing system could make use of multiple such techniques, establishing a respective count of users per technique, and the computing system could then use the highest count, an average of the counts, or another representation of the counts as a basis to proceed.

As noted above, the computing system that carries out this process may include the media player 100 and/or the control server 112, among other possibilities. In one implementation, for instance, the media player 100 may be communicatively linked with one or more sensors such as those discussed above, through wired and/or wireless connections, and a processor within the media layer 100 may be involved with the process. For instance, the processor of the media player 100 may evaluate sensor data to determine how many users 108 are present at the media-presentation device 106 and may transmit that determined count to the control server 112, so that control server 112 would thereby also determine the count. Or the processor of the media player may transmit the sensor data to the control server 112, and a processor of the control server may evaluate that data to determine how many users 108 are present at the media-presentation device 106 and may transmit that determined count to the media player 100, so that the media player 100 would thereby also determine the count. Other examples could be possible as well.

Based on how many users 108 the computing system determines are present at the media-presentation device 106, the computing system could then select, tailor, and/or otherwise establish media content to be output by the media player 100 and thus presented by the media presentation device 106. This aspect of the process could itself also take various forms.

In one example implementation, the computing system may include or have access to mapping data (e.g., a mapping table or database and/or corresponding program logic) that correlates various quantities of users with various media content, customizations of media content, or the like, that the computing system could cause the media player 100 to provide. Referring to such mapping data, the computing system could thus determine based on the determined quantity of users present at the media-presentation device 106, what media content to cause the media player 100 to output.

Such mapping data may indicate, for instance, that when the quantity of users at the media-presentation device 106 is just one user rather than multiple users, the computing system should cause the media player 100 to output a first media content rather second a media content, and when the quantity of users at the media-presentation device 106 is multiple users rather than just one user, the computing system should cause the media player 100 to output the second media content rather than the first media content. Accordingly, the computing system could determine whether the determined quantity is just one user or is rather multiple users and, based on the mapping data could take associated action.

Alternatively, such mapping data may indicate that when the quantity of users at the media-presentation device 106 is a first non-zero quantity of users rather than a second non-zero quantity of users, the computing system should cause the media player 100 to output a first media content rather than a second media content, and when the quantity of users at the media-presentation device 106 is the second non-zero quantity of users rather than the first non-zero quantity of users, the computing system should cause the media player 100 to output the second media content rather than the first media content. Accordingly, the computing system could determine whether the quantity is the first non-zero quantity or rather the second non-zero quantity and based on the mapping data, could take associated action.

Still alternatively, the mapping data may indicate that when the quantity of users at the media-presentation device 106 is within a first range rather than within a second range (e.g. mutually exclusive ranges), the computing system should cause the media player 100 to output a first media content rather than a second media content, and when the quantity of users at the media-presentation device 106 is within the second range rather than within the first range, the computing system should cause the media player to output the second media content rather than the first media content. Accordingly, the computing system could determine whether the quantity is within the first range or rather the second range and, based on the mapping data, could take associated action.

In an example implementation, this mapping data could be pre-provisioned for the computing system's use, such as by manual engineering input for instance. Alternatively or additionally, the mapping data could be established or updated over time based on programmatic evaluation of media content that media players output when various quantities of users are present. For instance, the computing system could have a learning mode or could generally operate with a learning mode, in which the computing system considers instance over time of media player 100 or each of various media players outputting media content, recording for each instance a correlation between (i) the media content output, possibly based on user selection, and (ii) the quantity of users present at the associated media-presentation device. Applying a machine learning process over time, the computing system could then detect patterns in this data, establishing typical correlations between particular quantities of users present and particular media content (e.g. genres of media content) output for presentation, and the computing system could record these correlations as correlations in the mapping data for its later reference as discussed above.

Note also that the computing system could also take into account other factors in addition to quantity of users present at the media-presentation device, as a basis for the computing system to determine what media content to cause the media player 100 to output for presentation by the media-presentation device 106.

For instance, in addition to considering how many users are present at the media-presentation device 106, the computing system could consider the identity of each of one or more of the users determined to be present at the media-presentation device. Considering the identity of one or more such present users may form a basis for the computing system further selecting, tailoring, or otherwise establishing what content to cause the media player 100 to output for presentation by the media-presentation device 106.

For example, the computing system may determine, based on the detected quantity of users present at the media-presentation device 106, that the computing system should cause the media player 100 to output media content of a particular genre. Based further on the identity of one or more such present users, the computing system may then select media content of that particular genre, and may cause the media player 100 to output that selected media content. As another example, the computing system may apply weights to the quantity of users present and the identities of users present, and may compute a weighted sum score that informs the computing system's decision of what media content to cause the media player 100 to output.

The computing system could apply various user identification processes to determine the identity of each of one or more users that the computing system determines to be present at the media-presentation device 106. Further, the computing system could associate each such identified user with one or more media content preferences, to form a further basis for the computing system determining what media content to cause the media player 100 to output.

To facilitate this in an example implementation, the computing system could be pre-provisioned with user-profile data that provides the computing system with identification data unique to each such user and with information about one or more media content preferences per user. When the computing system detects presence of a user at the media-presentation device 106, the computing system may then refer to this user profile data as a basis to determine the identity of the user and what media content the user's media-content prefers. And the computing system may then use the determined identity as an additional basis to control what media content to cause the media player 100 to output for presentation by the media-presentation device 106.

Individual users may provision the computing system with some or all of this user-profile data. For instance, users may enter their identification data and media-content preferences into the computing system, through a configuration interface of the media player 100 and through use of one or more sensors such as that noted above. Examples of such identification data could include biometric data such as images of iris or face features, images of clothing, accessories, hairstyle, or tattoos, videos of walking gate, and recordings of stepping sounds, among other possibilities. And examples of media-content preferences could include media content of particular style, artist, or the like, also among other possibilities.

As another example, the computing system could consider how a given user interacts with a remote control as a basis for the computing system to determine an identity of the user. For instance, the computing system could consider how quickly a user presses a series of buttons on a remote control and/or what sequence of buttons the user tends to press on the remote control. In an example implementation, each of various users at a customer premises may have their own respective user account on the media player 100. When a given such user is logged into their own account, the computing system may deem (correctly or not) button presses on a remote control of the media player 100 to be button presses by that user.

The computing system may then track over time how quickly each such user sequences through remote-control button presses and/or what sequence of remote-control buttons the user tends to press, and the computing system may keep a record of these data points in correlation with the user identity. Thereafter, the computing system could then detect a particular speed and/or sequence of remote-control button presses and could refer to the recorded data as a basis to determine that that detected speed and/or sequence of remote-control button presses corresponds with a particular user identity, thus determining that that is the identity of a user present at the media-presentation device 106. The computing system could then use that determined identify as noted above, as a further basis to control what media content to cause the media player 100 to output for presentation by the media-presentation device 106.

In an example implementation, once the computing system determines what media content to cause the media player 100 to output for presentation by the media-presentation device 106, the computing system could then cause the media player 100 to so output the determined media content for presentation by the media-presentation device 106.

The act of the computing system causing the media player 100 to output this determined media content could also take various forms. For instance, if the control server 112 determines that the media player 100 should output the media content, the control server 112 may engage in control signaling with the media player 100 and/or with the media server 110 to tailor media content that the media player 100 outputs, perhaps media content that is or will be streamed or otherwise provided to the media player 100 for playout, to include the determined media content. Alternatively, if the media player 100 determines that the media player 100 should output the media content, the media player 100 may itself tailor media content that the media player 100 outputs, to include the determined media content.

FIG. 4 illustrates how the media content presented by the media-presentation device 106 could vary based on whether there is just one user present at the media-presentation device 106 or rather there are multiple users present at the media-presentation device 106. In particular, FIG. 4 illustrates an example room 400 in which the media-presentation device 106 operates. In part A, FIG. 4 then shows that when just a single user 108 present in the room, the media-presentation device 106 presents media content 402 selected (e.g., selected, tailored, or otherwise established) based on just a single user being present at the media-presentation device 106. And in part B, FIG. 4 shows that when multiple users 108 are present in the room, the media-presentation device instead presents media content 404 selected based on multiple users being present at the media-presentation device 106.

FIG. 5 next illustrates how the media content presented by the media-presentation device 106 could vary based on whether the quantity of users present at the media-presentation device 106 is a first quantity or rather a second quantity. In particular, FIG. 5 illustrates an example room 500 in which the media-presentation device 106 operates. In part A, FIG. 5 then shows that when there is a first quantity of users in the room, the media-presentation device 106 presents media content 502 selected based on the quantity of users present at the media-presentation device 106 being the first quantity. And in part B, FIG. 5 shows that when there is a second quantity of users in the room, the media-presentation device 106 presents media content 504 selected based on the quantity of users present at the media-presentation device 106 being the second quantity. Here, at issue could be whether the quantity of users in the room equals a predefined quantity value or falls within a predefined quantity range, among other possibilities.

Having the computing system use the quantity of users determined to be present at the media-presentation device 106 as a basis to control what media content the media player 100 will output for presentation by the media-presentation device 106 could dynamically impact various aspects of media content presentation.

By way of example, based on the quantity of users determined to be present at the media-presentation device 106, the computing system could vary presentation of one or more GUIs that the media player 100 will output for presentation by the media-presentation device 106. For instance, the computing system could tailor what channel options are presented in a channel-selection GUI, what background design is presented in a GUI, and/or what other menu options are presented in a GUI, among other possibilities. The computing system could do this by structuring underlying markup of the GUI accordingly, among other possibilities.

Figure 6A:
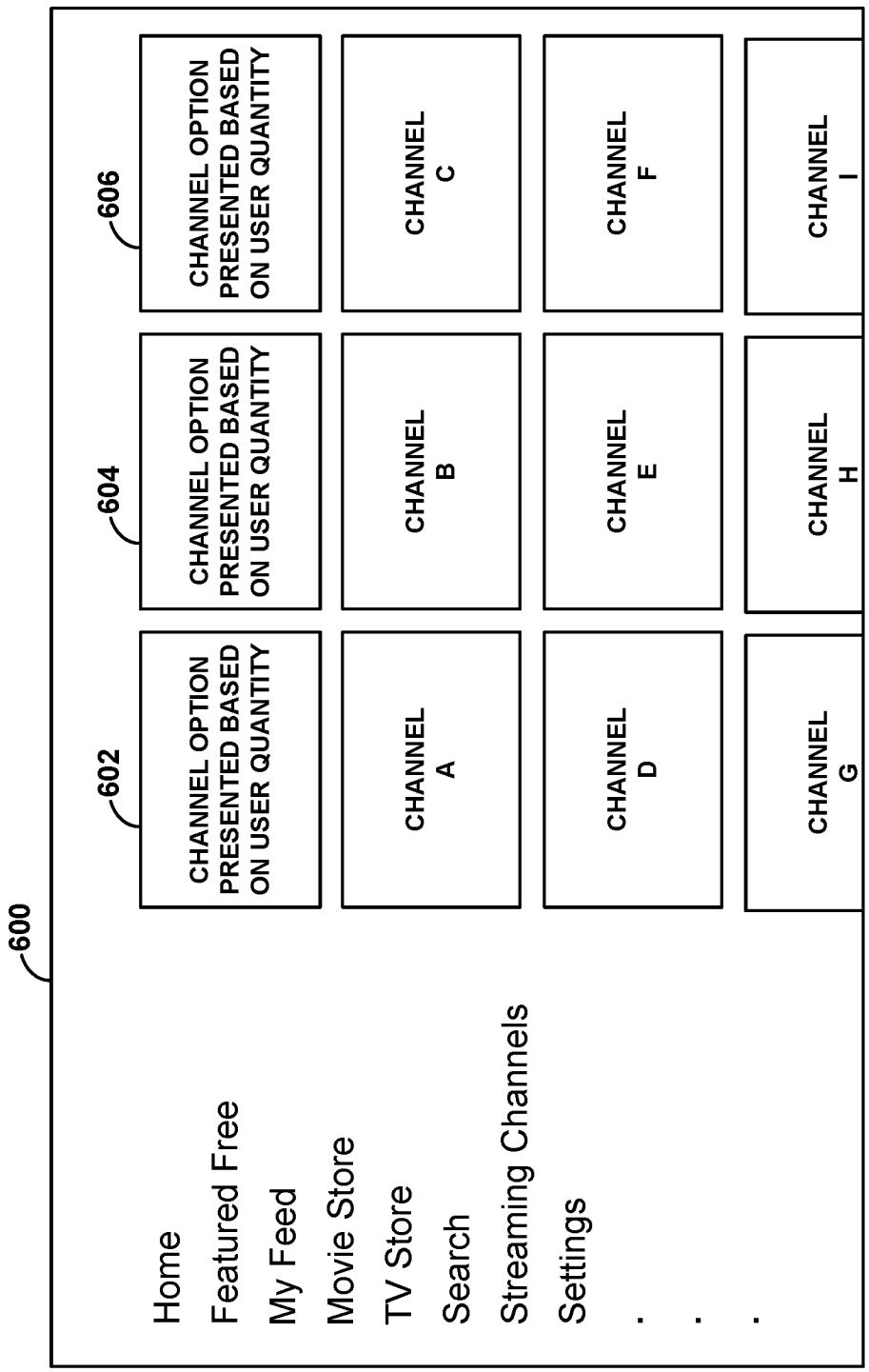
FIG. 6A is a simplified illustration of a GUI with channel-selection options tailored based on quantity of users present at the media-presentation device.

FIG. 6A illustrates an example result of the computing system using the quantity of users determined to be present at the media-presentation device 106 as a basis to tailor what channel options are presented in a channel-selection GUI that the media player 100 outputs for presentation by the media-presentation device 106. In particular, FIG. 6A illustrates a GUI 600 as a modified version of the GUI 200 shown in FIG. 2. In the modification shown in FIG. 6A, the GUI 600 includes three channel options 602, 604, 606 presented based on the quantity of users determined to be present at the media-presentation device 106.

The computing system may select these particular channel options to be presented based on a consideration of what channels the media player 100 has played in the past (e.g., in response to user requests) in correlation with particular quantities of users determined to be present at the media-presentation device 106. For instance, if data shows that the media player 100 has tended to play cooking channels when just a single user is present at the media-presentation device 106, then, if the determined quantity of users is just one user, the computing system may include one or more cooking channel option among channel options 602, 604, 606 in the example GUI 600. Likewise, if data shows that the media player 100 has tended to play movie channels when multiple users are present at the media-presentation device 106, then, if the determined quantity of users is multiple users, the computing system may include one or more movie channels among channel options 602, 604, 606 in the example GUI 600. Other examples, including other bases for controlling what channel options to present based on a consideration of how many users are present at the media-presentation device 106, could be possible as well.

In an example implementation, the act of selecting channel options could be based on various factors, examples of which include how many users are determined to be present at the media-presentation device and/or which user(s) are determined to be present at the media-presentation device, among other possibilities. For instance, the process could involve the computing system selecting channel options based on a determination that one or more users present at the media-presentation device have characteristics that would associate the user(s) with a particular class that may prefer particular media content (such as children, who may prefer kids content, etc.)

Figure 6B:
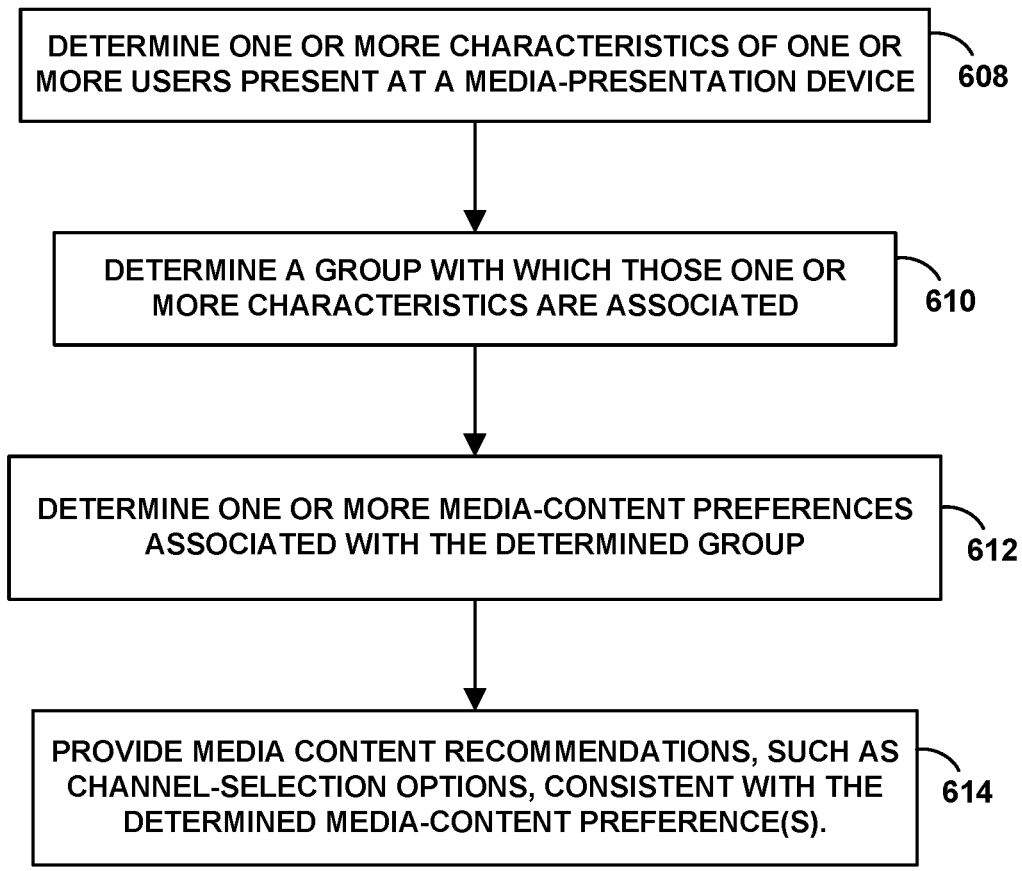
FIG. 6B is a flow chart depicting a method that can be carried out in accordance with the disclosure.

FIG. 6B is a flow chart illustrating an example of this process. As shown in FIG. 6B, at block 608, a method could include the computing system determining one or more characteristics of one or more users present at the media-presentation device. At block 610, the method could then include the computing system determining a group with which those one or more characteristics are associated. At block 612, the method may then include determining one or more media-content preferences associated with the determined group. And at block 614, the method may then include providing media content recommendations, such as channel-selection options, consistent with the determined media-content preference(s). For example, the computing system may determine based on body attributes or the like that there one or more people present at the media-presentation device are children, and the computing system could then determine from predefined data that children prefer certain channels that are deemed to be kid-friendly so the computing system could then select one or more such channels and present the selected channel(s) as channel options in a GUI such as that shown in FIG. 6A.

Figure 7A:
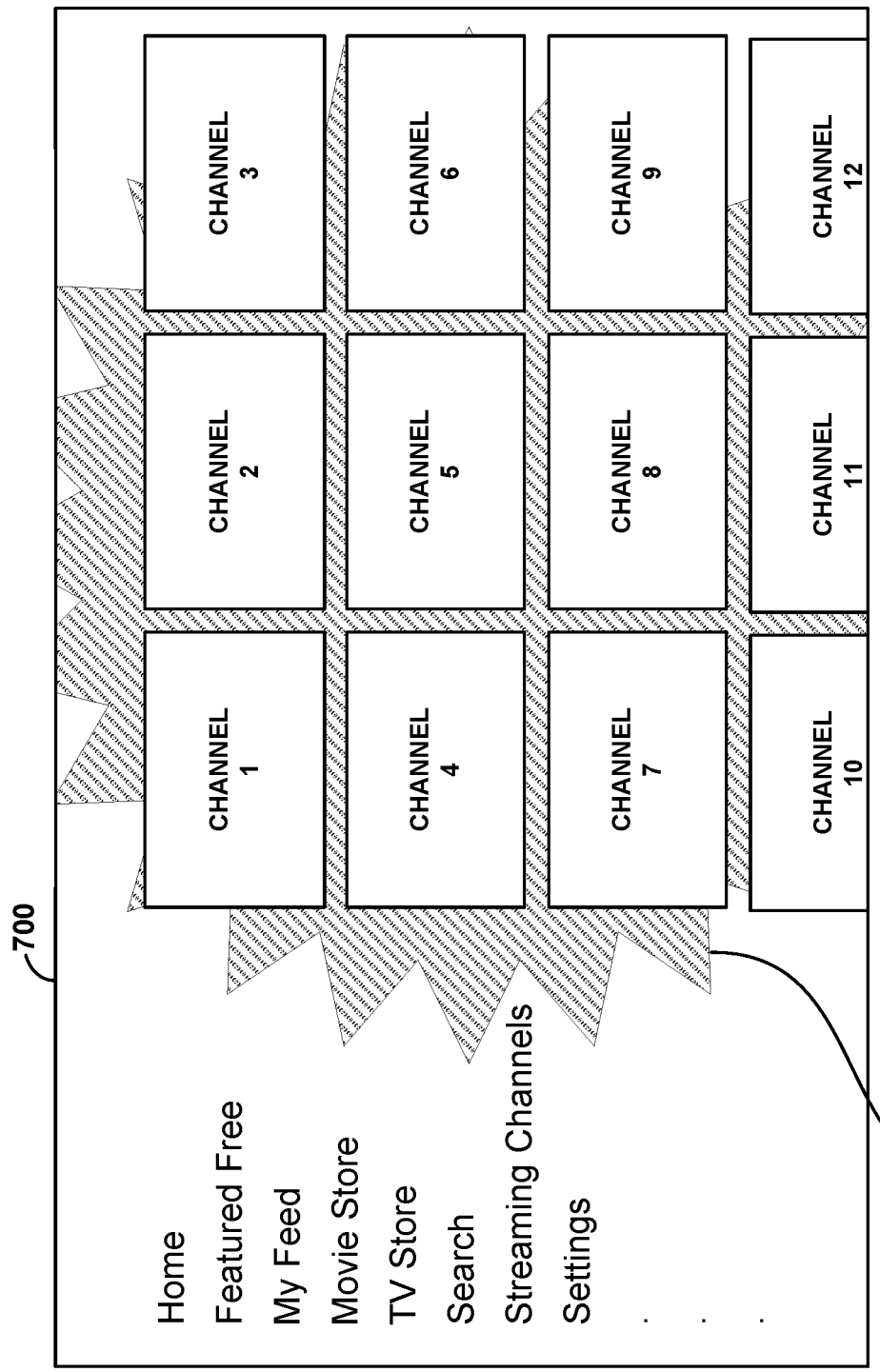
FIG. 7A is a simplified illustration of a GUI with a background design tailored based on quantity of users present at the media-presentation device.

FIG. 7A next illustrates an example result of the computing system using the quantity of users determined to be present at the media-presentation device 106 as a basis to tailor what background design is presented in a GUI that the media player 100 outputs for presentation by the media-presentation device 106. In particular, FIG. 7 illustrates a GUI 700 similarly as a modified version of the GUI 200 shown in FIG. 2. In the modification shown in FIG. 7, the GUI 700 includes a background graphic 702 (shown arbitrarily as a starburst in the figure) selected based on the quantity of users determined to be present at the media-presentation device 106.

The computing system might select this background graphic based on predefined correlations between various determined user quantities and various background graphics and/or based on one or more other considerations. For instance, if the computing system determines that just one or another small number of users is present at the media-presentation device 106, the computing system could use the predefined correlations as a basis to select a relatively subdued background graphic and could structure the GUI to include that selected background graphic. Whereas, if the computing system determines that at least a predefined threshold great number of users is present at the media-presentation device 106, the computing system could use the predefined correlations as a basis to select a more boisterous background graphic, such as a graphic with a party theme for instance, and could structure the GUI to include that selected background graphic. Other examples could be possible as well.

Figure 7B:
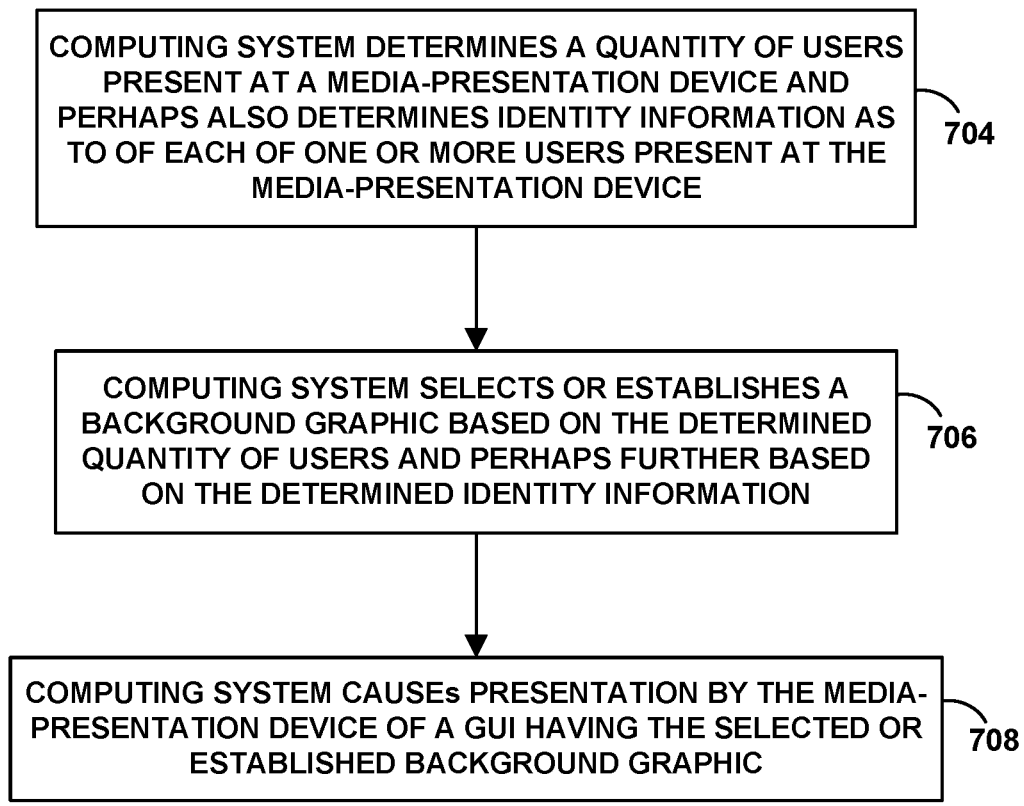
FIG. 7B is another flow chart depicting a method that can be carried out in accordance with the disclosure.

FIG. 7B is a flow chart illustrating an associated method. As shown in FIG. 7B, at block 704, a computing system could determine a quantity of users present at a media-presentation device and could perhaps also determine identity information as to of each of one or more users present at the media-presentation device. At block 706, the computing system could then select or establish a background graphic based on the determined quantity of users and perhaps further based on the determined identity information. At block 708, the computing system could then cause presentation by the media-presentation device of a GUI having the selected or established background graphic.

Possibly related to varying GUI presentation, the computing system may also use the quantity of users determined to be present at the media-presentation device 106 as a basis to select streaming-media content and/or other such content for the media player 100 to output for presentation by the media-presentation device 106. For instance, based on the determined quantity of users, the computing system may select a particular television program, movie, song, or other media content to have the media player 100 play and may cause the media player 100 to play that media content for presentation by the media-presentation device.

One example of this could be where a user puts the media player 100, perhaps a channel of the media player, in a random play or autonomous-selection mode in which the user would expect the media player 100 to select media content to play. In response to the media player 100 being put in this mode, the computing system could then select media content based on the quantity of users determined to be present at the media-presentation device 106 and could cause the media player 100 to play that selected media content. Here too, the computing system might make this selection based on past playout statistics in correlation with user-quantity data, such as by selecting particular media content based on the determined user quantity in view of a past tendency for the media player to play (e.g., in response to user requests) media content of the same or similar genre when the same or similar determined user quantity is present.

Figure 8:
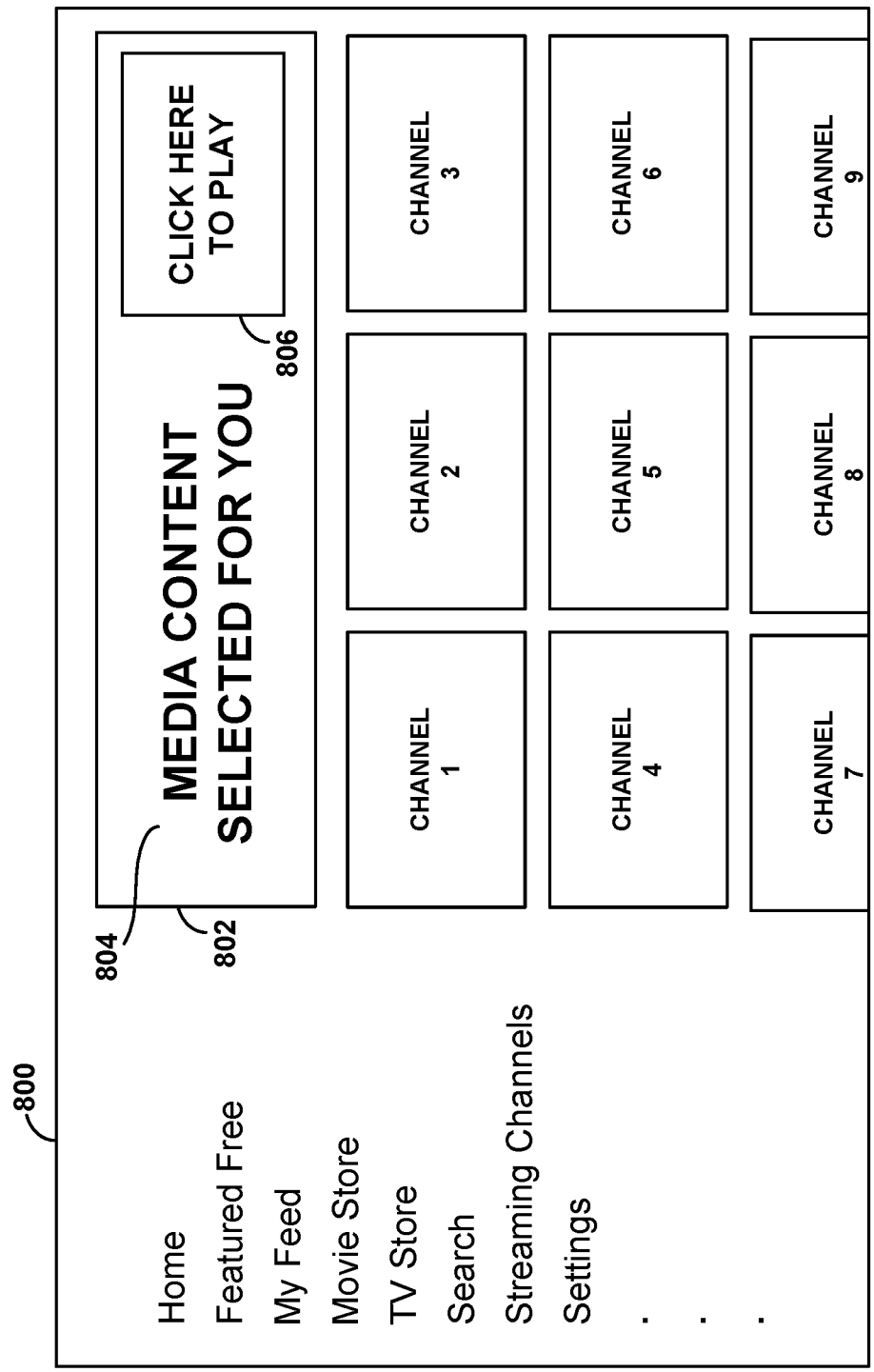
FIG. 8 is a simplified illustration of a GUI providing a prompt for user approval to play content selected based on quantity of users present at the media-presentation device.

Another example of this could be where the computing system modifies a GUI to present a prompt seeking user approval for presentation of media content selected based on the quantity of users determined to be present at the media-presentation device 106. FIG. 8 illustrates an example of how this could look in practice. In particular, FIG. 8 illustrates a GUI 800 similarly as a modified version of the GUI 200 shown in FIG. 2. In the modification shown in FIG. 8, the GUI 700 includes a banner graphic 802 that presents a prompt 804 stating "Media Content Selected for You" and including a button 806 stating "Click Here to Play". With this example the computing system may have selected a television program, movie, song, or other media content to play based on consideration of how many users are present at the media-presentation device 106 and may have made button 806 an actionable link that, when engaged by a user, would trigger the media player 100 playing out that selected media content. Other examples could be possible here as well.

Figure 9:
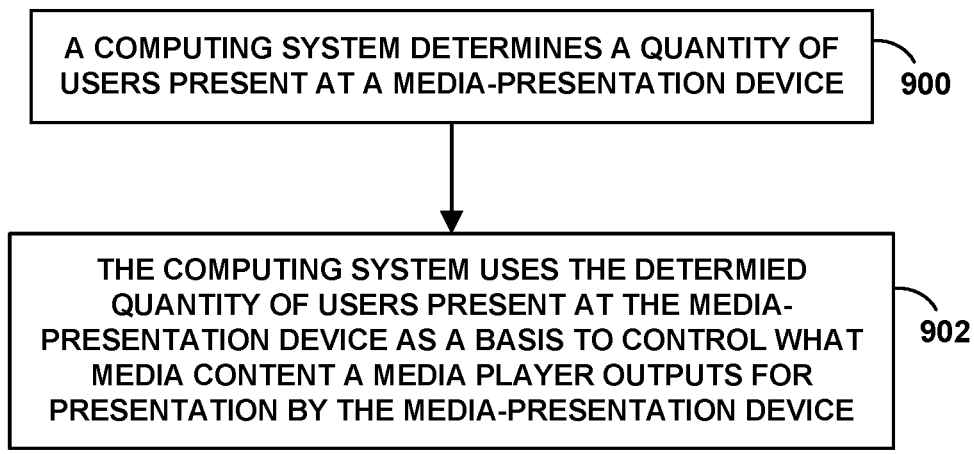
FIG. 9 is another flow chart depicting a method that can be carried out in accordance with the disclosure.

FIG. 9 is next a flow chart illustrating an example method that could be carried out in accordance with the present disclosure, to control media-content presentation based on user presence. As shown in FIG. 9, at block 900, the method includes a computing system determining a quantity of users are present at a media-presentation device. Further, at block 902, the method includes the computing system using the determined quantity of users present at the media-presentation device as a basis to control what media content a media player outputs for presentation by the media-presentation device.

In line with the discussion above, the media content at issue in this process could be video content and/or audio content. For instance, the media player may be configured to play video media, and the media-presentation device may be a TV or other video-presentation device (which may also include audio presentation functionality), in which case the computing system may use the quantity of users determined to be present at the display system as a basis to control what video content (e.g., GUIs, programming, movies, etc.) the media player outputs for presentation by the display system. Or the media player could be configured to play audio such as music, and the media-presentation system may be a sound-speaker or other audio-presentation device (which may also include video presentation functionality), in which case the computing system may use the quantity of users determined to be present at the sound-speaker as a basis to control what audio, such as what music, the media player outputs for presentation by the sound speaker.

Further, as discussed above, the media player and media-presentation device may be separate devices or may be integrated together. For instance, the media player and media-presentation device may be separate devices that are connected with each other by a wired and/or wireless connection. Alternatively, the media player and media-presentation device may be integrated with each other such as in the form of a media-presentation device including an integrated media player. As specific examples of the latter, a TV could include an integrated video player and/or a sound speaker could include an integrated audio player. Other examples are possible as well.

As additionally discussed above, the act of the computing system using the determined quantity of users present at the media-presentation device as a basis to control what media content the media player outputs for presentation by the media-presentation device could involve the computing system referring to mapping data that correlates various quantities of users with various media content, to determine, based on the determined quantity of users present at the media-presentation device, what media content to cause the media player to output.

Further, as discussed above, the act of the computing system using the determined quantity of users present at the media-presentation device as a basis to control what media content a media player outputs for presentation by the media-presentation device could involve (i) making a determination of whether the determined quantity of users is one or is rather more than one, (ii) if the determination is that the determined quantity of users is just one rather than more than one, then, based on the determination, causing the media player to output for presentation by the media-presentation device a first media content rather than a second media content, and (iii) if the determination is that the determined quantity of users is more than one rather than just one, then, based on the determination, causing the media player to output for presentation by the media-presentation device the second media content rather than the first media content.

Still further, as discussed above, the act of the computing system using the determined quantity of users present at the media-presentation device as a basis to control what media content a media player outputs for presentation by the media-presentation device could involve (i) making a determination of whether the determined quantity of users is a first non-zero quantity of users or is rather a second non-zero quantity of users, the first non-zero quantity differing from the second non-zero quantity, (ii) if the determination is that the determined quantity of users is the first non-zero quantity of users rather the second non-zero quantity of users, then, based on the determination, causing the media player to output for presentation by the media-presentation device a first media content rather than a second media content, and (iii) if the determination is that the determined quantity of users is the second non-zero quantity of users rather than the first non-zero quantity of users, then, based on the determination, causing the media player to output for presentation by the media-presentation device the second media content rather than the first media content.

Yet further, as discussed above, the act of the computing system using the determined quantity of users present at the media-presentation device as a basis to control what media content a media player outputs for presentation by the media-presentation device could involve (i) making a determination of whether the determined quantity of users falls within a first range of user quantity or rather within a second range of user quantity, the first range and second range being mutually exclusive, (ii) if the determination is that the determined quantity of users falls within the first range rather than within the second range, then, based on the determination, causing the media player to output for presentation by the media-presentation device a first media content rather than a second media content, and (iii) if the determination is that the determined quantity of users falls within the second range rather than within the first range, then, based on the determination, causing the media player to output for presentation by the media-presentation device the second media content rather than the first media content.

As additionally discussed above, the act of using the determined quantity of users present at the media-presentation device as a basis to control what media content the media player outputs for presentation by the media-presentation device could involve using the determined quantity of users present at the media-presentation device as a basis to tailor a GUI that the media player outputs for presentation by the media-presentation device. For instance, this could involve using the determined quantity of users present at the media presentation device as a basis to tailor what channel options are provided by the GUI.

Further, as discussed above, the act of using the determined quantity of users present at the media-presentation device as a basis to control what media content the media player outputs for presentation by the media-presentation device could involve using the determined quantity of users present at the media-presentation device as a basis to select television programming or movie content for the media player to output for presentation by the media-presentation device.

In addition, as discussed above, the act of determining the quantity of users present at the media-presentation device could involve applying at least one presence-detection technique such computer-vision, proxy detection of wireless signaling, and/or voice recognition. Further, as noted above, the computing system could include an entity such as the media player and/or a server in communication with the media player.

Further, as noted above, the computing system could base the control, of what media content the media player presents, on one or more additional factors as well. For instance, the computing system could additionally base the control on an identity of at least a given user determined to be present at the media-presentation device. In this case, the computing system may further determine the identity of at least the given user.

As further discussed above, the act of using the determined quantity of users present at the media-presentation device as a basis to control what media content the media player outputs for presentation by the media-presentation device could be based on past usage data indicating media playout by the media player in correlation with quantities of users present at the media presentation device.

Figure 10:
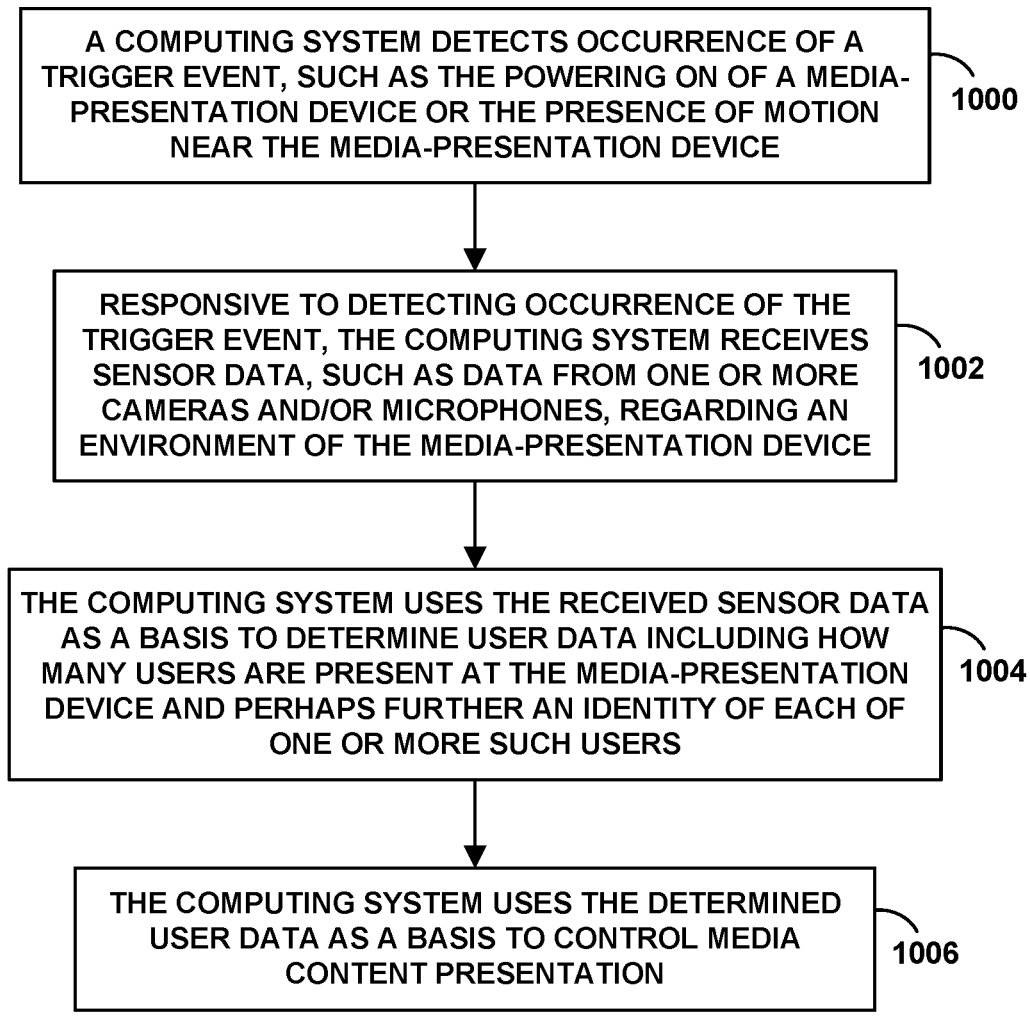
FIG. 10 is another flow chart depicting a method that can be carried out in accordance with the disclosure.

FIG. 10 is a further flow chart illustrating an example method that could be carried out in accordance with the present disclosure. As shown in FIG. 10, at block 1000, a computing system could detect occurrence of a trigger event, such as the powering on of a media-presentation device or the presence of motion near the media-presentation device. At block 1002, responsive to detecting occurrence of the trigger event, the computing system could then receive sensor data, such as data from one or more cameras and/or microphones, regarding an environment of the media-presentation device. At block 1004, the computing system could then use the received sensor data as a basis to determine user data including how many users are present at the media-presentation device and perhaps further an identity of each of one or more such users. At block 1006, the computing system could then use the determined user data as a basis to control media content presentation. Examples of such control could include causing the media-presentation device to present one or more channel options or background content based on the user data, and/or invoking parental control or other content restrictions or allowances, among other possibilities.

Figure 11:
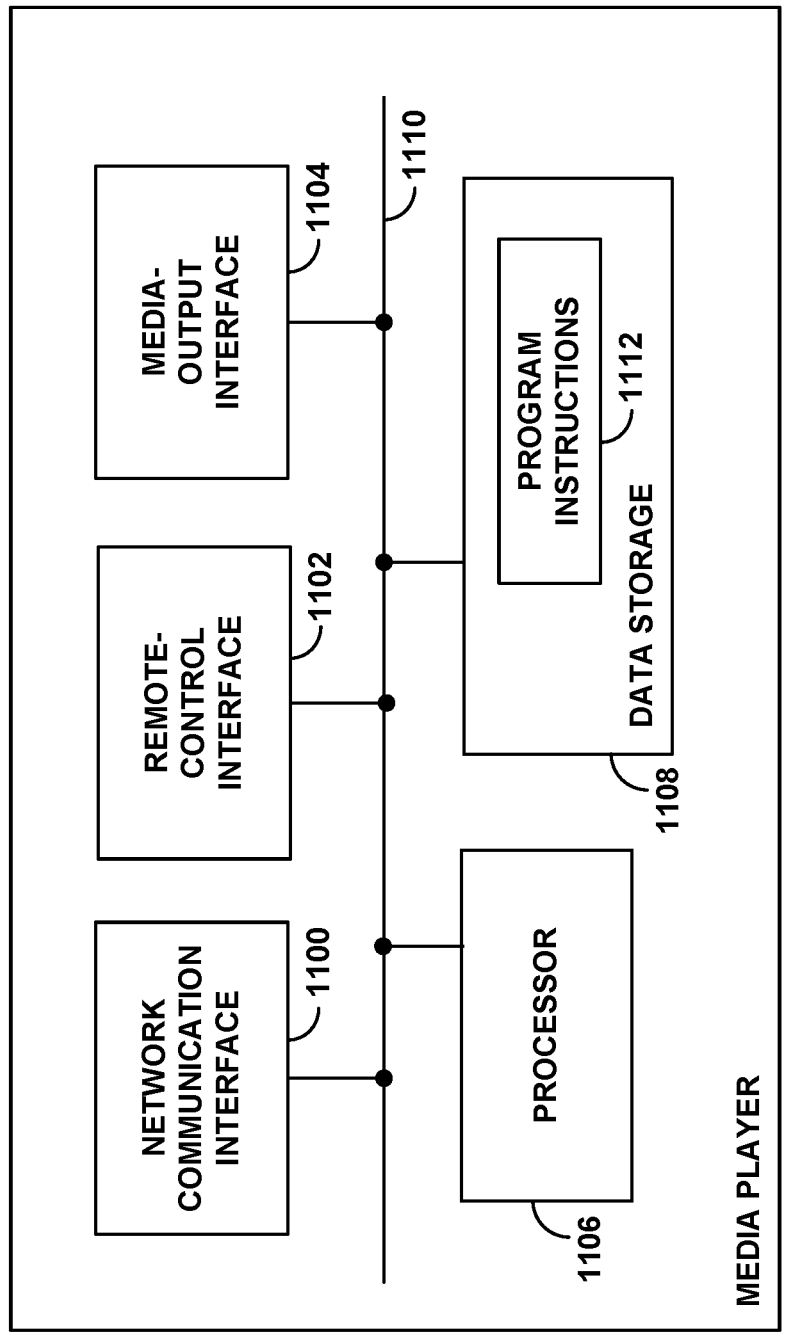
FIG. 11 is a simplified block diagram of an example system operable in accordance with the disclosure.

FIG. 11 is a simplified block diagram of an example media player such as an OTT media player. As shown in FIG. 11, the example media player includes a network communication interface 1100, a remote-control interface 1102, a media-output interface 1104, a processor 1106, and non-transitory data storage 1108, any or all of which could be integrated together or, as shown, communicatively linked together by a system bus, network, or other connection mechanism 1110. If the media player is integrated in the media-presentation device, some or all of these components could be components of the media-presentation device.

The network communication interface 1100 could comprise a physical communication interface and associated logic, enabling the media player to engage in network communication, such as to engage in control signaling with one or more control servers and to receive streaming media from one or more media servers, among other possibilities. In an example implementation, the network communication interface 1100 could include a WiFi interface facilitating WLAN communication, through which the media player could engage in internet communication with a server platform as discussed above.

The remote-control interface 1102 could comprise a physical short-range wireless communication interface and associated logic, enabling the media player to engage in communication with a handheld remote control, such as to receive user commands to navigate through GUIs and to control playout of streaming media, among other possibilities. The remote-control interface could operate according to any standard or proprietary communication protocol.

The media-output interface 1104 could comprise a physical wired or wireless communication interface and associated logic, enabling the media player to communicate with a media-presentation device and to output media content such as GUIs and streaming-media content for presentation by the media-presentation device. This interface could be an HDMI interface or internal data bus, among other possibilities.

The processor 1106 could comprise one or more general purpose processors (e.g., microprocessors) and/or one or more specialized processors (e.g., application specific integrated circuits). And the non-transitory data storage 1108 could comprise one or more volatile and/or non-volatile storage components, such as optical, flash, magnetic, RAM, ROM, or other storage, possibly integrated in whole or in part with the processor 1106. Further, as shown, the data storage 1108 could store stores program instructions 1112, which could be executable by the processor 1106 to carry out (e.g., cause the media player to carry out) various operations described herein.

Various features described herein could be implemented in this context as well, and vice versa.

Figure 12:
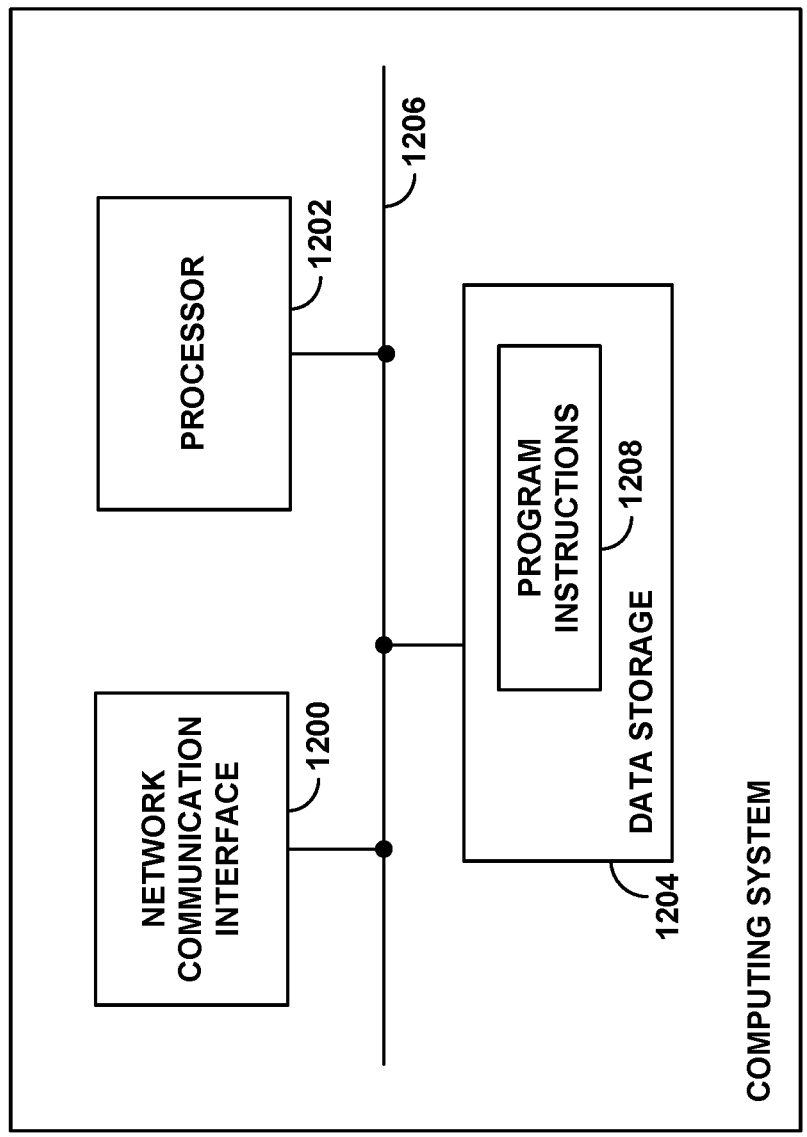
FIG. 12 is a simplified block diagram of an example content presentation device operable in accordance with the disclosure.

FIG. 12 is next a simplified block diagram of a computing system that could be configured to operate according to the present disclosure. This block diagram may represent aspects of entities discussed herein, such as the media player and/or one or more servers, among other possibilities. As shown in FIG. 12, the example computing includes a network communication interface 1200, a processor 1202, and non-transitory data storage 1204, any or all of which could be integrated together or, as shown, communicatively linked together by a system bus, network, or other connection mechanism 1206.

The network communication interface 1200 could comprise a physical communication interface and associated logic, enabling the computing system to engage in network communication with one or more other local or remote entities. For instance, the network communication interface 1200 could comprise a wireless or wired Ethernet interface or other type of network interface, for engaging in IP communication and/or other type of network communication.

The processor 1202 could comprise one or more general purpose processors (e.g., microprocessors) and/or one or more specialized processors (e.g., application specific integrated circuits). And the non-transitory data storage 1204 could comprise one or more volatile and/or non-volatile storage components, such as optical, flash, magnetic, RAM, ROM, or other storage, possibly integrated in whole or in part with the processor 1202. Further, as shown, the data storage 1204 could store stores program instructions 1208, which could be executable by the processor 1202 to carry out (e.g., cause the computing system to carry out) various operations described herein.

Various features described herein could be implemented in this context as well, and vice versa.

Further, the present disclosure also contemplates one or more non-transitory computer-readable media encoded with, storing, or otherwise embodying program instructions executable by at least one processor of a computing system to cause the computing system to carry out various operations as described herein.

In addition to the above-discussion features related to controlling media-content presentation based on user presence, the present disclosure also contemplates an advance more generally related to device control. In particular, the disclosure contemplates dynamically porting a user's preferences for operational state of one or more devices when the user stays at a hotel or the like.

In an example implementation of this additional advance, a given user could have an internet of things (IoT) profile or other device profile that defines one or more preferences that the user has for operational state of devices in the user's home, office, or the like. When the user makes a hotel reservation (or a hotel reservation is made for the user), the user's device profile can be associated with that reservation. For instance, if the user's device profile is stored in a predefined manner such as in an extensible markup language document or other format, a person making the hotel reservation could provide in the hotel reservation record a link to the stored device profile. When the user then checks into the hotel in accordance with the reservation, a computing system at the hotel could read the associated user's device profile from its linked location and could port the user's preferences for device operational state to one or more devices in the hotel room assigned to the user. For instance, the computing system could engage in signaling with one or more devices and/or control systems in or for the user's assigned hotel room, to apply the user's preferences accordingly.

Examples of device operational preferences that could be ported to a user's hotel room in this process could include, without limitation, light brightness and/or color temperature, room temperature, shower water temperature, background music genre or other selection, TV channel options presented on a TV in the room, white noise output volume and tone from a white noise machine in the room, and alarm clock settings.

Accordingly, a further method could include (i) detecting when a user checks in to a hotel in accordance with a hotel reservation, and (ii) responsive to the detecting, porting one or more device operational-state preferences, from a profile associated with the user, to a hotel room assigned to the user for the hotel reservation. Further, a computing system could be configured with a structure similar to that described above, and the program instructions could be executable to cause the computing system carry out these or other such operations. Still further, a non-transitory computer-readable medium similar to that described above could embody program instructions executable by a processor to cause a computing system to carry out such operations.

Exemplary embodiments have been described above. Those skilled in the art will understand, however, that changes and modifications may be made to these embodiments without departing from the true scope and spirit of the invention.

What is claimed is:

1. A method for controlling media-content presentation based on user presence, the method comprising:
    determining, by a computing system, a quantity of users present at a media-presentation device, wherein the quantity is at least one; and
    based on the determining, using, by the computing system, the determined quantity of users present at the media-presentation device as a basis to control what media content a media player outputs for presentation by the media-presentation device,
    wherein using the determined quantity of users as a basis to control what media content the media player outputs for presentation comprises (i) finding from past-usage data that the media player has played given media content when the same determined quantity of users was present at the media-presentation device and (ii) based on the finding, causing the media player to output the given media content for presentation by the media-presentation device.

2. The method of claim 1, wherein the media-presentation device comprises a video-presentation device, and wherein using the determined quantity of users present at the media-presentation device as a basis to control what media content the media player outputs for presentation by the media-presentation device comprises using the determined quantity of users present at the media-presentation device as a basis to control what video content the media player outputs for presentation by the media-presentation device.

3. The method of claim 1, wherein the media-presentation device comprises an audio-presentation device, and wherein using the determined quantity of users present at the media-presentation device as a basis to control what media content the media player outputs for presentation by the media-presentation device comprises using the determined quantity of users present at the media-presentation device as a basis to control what audio content the media player outputs for presentation by the media-presentation device.

4. The method of claim 1, wherein using the determined quantity of users present at the media-presentation device as a basis to control what media content a media player outputs for presentation by the media-presentation device comprises:
   making a determination of whether the determined quantity of users is one or is rather more than one;
   if the determination is that the determined quantity of users is just one rather than more than one, then, based on the determination, causing the media player to output for presentation by the media-presentation device a first media content rather than a second media content; and
   if the determination is that the determined quantity of users is more than one rather than just one, then, based on the determination, causing the media player to output for presentation by the media-presentation device the second media content rather than the first media content.

5. The method of claim 1, wherein using the determined quantity of users present at the media-presentation device as a basis to control what media content a media player outputs for presentation by the media-presentation device comprises:
   making a determination of whether the determined quantity of users is a first non-zero quantity of users or is rather a second non-zero quantity of users, wherein the first non-zero quantity differs from the second non-zero quantity;
   if the determination is that the determined quantity of users is the first non-zero quantity of users rather the second non-zero quantity of users, then, based on the determination, causing the media player to output for presentation by the media-presentation device a first media content rather than a second media content; and
   if the determination is that the determined quantity of users is the second non-zero quantity of users rather than the first non-zero quantity of users, then, based on the determination, causing the media player to output for presentation by the media-presentation device the second media content rather than the first media content.

6. The method of claim 1, wherein using the determined quantity of users present at the media-presentation device as a basis to control what media content a media player outputs for presentation by the media-presentation device comprises:
   making a determination of whether the determined quantity of users falls within a first range of user quantity or rather within a second range of user quantity, wherein the first range and second range are mutually exclusive;
   if the determination is that the determined quantity of users falls within the first range rather than within the second range, then, based on the determination, causing the media player to output for presentation by the media-presentation device a first media content rather than a second media content; and
   if the determination is that the determined quantity of users falls within the second range rather than within the first range, then, based on the determination, causing the media player to output for presentation by the media-presentation device the second media content rather than the first media content.

7. The method of claim 1, wherein using the determined quantity of users present at the media-presentation device as a basis to control what media content the media player outputs for presentation by the media-presentation device comprises using the determined quantity of users present at the media-presentation device as a basis to tailor a graphical user interface that the media player outputs for presentation by the media-presentation device.

8. The method of claim 7, wherein using the determined quantity of users present at the media-presentation device as a basis to tailor a graphical user interface that the media player outputs for presentation by the media-presentation device comprises using the determined quantity of users present at the media presentation device as a basis to tailor what channel options are provided by the graphical user interface.

9. The method of claim 1, wherein using the determined quantity of users present at the media-presentation device as a basis to control what media content the media player outputs for presentation by the media-presentation device comprises using the determined quantity of users present at the media-presentation device as a basis to select television programming or movie content for the media player to output for presentation by the media-presentation device.

10. The method of claim 1, wherein determining by the computing system the quantity of users present at the media-presentation device comprises applying at least one presence-detection technique selected from the group consisting of computer-vision, proxy detection of wireless signaling, and voice recognition.

11. The method of claim 1, wherein the computing system comprises at least one entity selected from the group consisting of the media player and a server in communication with the media player.

12. The method of claim 1, further comprising the computing system basing the control on one or more additional factors as well.

13. The method of claim 12, wherein the one or more additional factors comprises an identity respectively of at least a given user determined to be present at the media-presentation device.

14. The method of claim 13, further comprising determining by the computing system the identity of the given user determined to be present at the media-presentation device.

15. The method of claim 1, wherein finding from past-usage data that the media player has played given media content when the same determined quantity of users was present at the media-presentation device comprises finding from the past-usage data that the media player has played the given media content in response to user request when the same determined quantity of users was present at the media presentation device.

16. The method of claim 1, wherein the given media content comprises a genre of one or more media channels.

17. A computing system comprising:
   at least one processor;
   non-transitory data storage; and
   program instructions stored in the non-transitory data storage and executable by the at least one processor to carry out operations for controlling media-content presentation based on user presence, the operations including:
      determining a quantity of users present at a media-presentation device, wherein the quantity is at least one, and
      based on the determining, using the determined quantity of users present at the media-presentation device as a basis to control what media content a media player outputs for presentation by the media-presentation device, wherein using the determined quantity of users as a basis to control what media content the media player outputs for presentation comprises (i) finding from past-usage data that the media player has played given media content when the same determined quantity of users was present at the media-presentation device and (ii) based on the finding, causing the media player to output the given media content for presentation by the media-presentation device.

18. The computing system of claim 17, wherein the given media content comprises a genre of one or more media channels.

19. A non-transitory computer-readable medium embodying program instructions executable by at least one processor of a computing system to cause the computing system to carry out operations for controlling media-content presentation based on user presence, the operations comprising:

determining a quantity of users present at a media-presentation device, wherein the quantity is at least one; and based on the determining, using the determined quantity of users present at the media-presentation device as a basis to control what media content a media player outputs for presentation by the media-presentation device, wherein using the determined quantity of users as a basis to control what media content the media player outputs for presentation comprises (i) finding from past-usage data that the media player has played given media content when the same determined quantity of users was present at the media-presentation device and (ii) based on the finding, causing the media player to output the given media content for presentation by the media-presentation device.

20. The non-transitory computer-readable medium of claim 19, wherein using the determined quantity of users present at the media-presentation device as a basis to control what media content the media player outputs for presentation by the media-presentation device comprises:

referring to mapping data that correlates various quantities of users with various media content, to determine, based on the determined quantity of users present at the media-presentation device, what media content to cause the media player to output.

* * * * *